(12) United States Patent
Matres et al.

(10) Patent No.: US 11,002,912 B2
(45) Date of Patent: May 11, 2021

(54) TUNABLE RING RESONATOR MULTIPLEXERS

(71) Applicant: Hewlett Packard Enterprise Development LP, Houston, TX (US)

(72) Inventors: Joaquin Matres, Palo Alto, CA (US); Wayne Victor Sorin, Mountain View, CA (US); Sagi Mathai, Sunnyvale, CA (US); Lars Helge Thylen, Huddinge, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/781,560

(22) PCT Filed: Dec. 11, 2015

(86) PCT No.: PCT/US2015/065314
§ 371 (c)(1),
(2) Date: Jun. 5, 2018

(87) PCT Pub. No.: WO2017/099802
PCT Pub. Date: Jun. 15, 2017

(65) Prior Publication Data
US 2019/0113686 A1    Apr. 18, 2019

(51) Int. Cl.
*G02B 6/293*   (2006.01)
*G02B 6/42*    (2006.01)
(Continued)

(52) U.S. Cl.
CPC ....... *G02B 6/29343* (2013.01); *G02B 6/2938* (2013.01); *G02B 6/29341* (2013.01);
(Continued)

(58) Field of Classification Search
None
See application file for complete search history.

(56) References Cited

U.S. PATENT DOCUMENTS

| 6,947,632 | B2  |   | 9/2005 | Fischer |           |
|-----------|-----|---|--------|---------|-----------|
| 7,200,299 | B1  | * | 4/2007 | Earnshaw | ......... G02B 6/12007 |
|           |     |   |        |         | 385/17    |

(Continued)

FOREIGN PATENT DOCUMENTS

WO    2012/159341 A1    11/2012

OTHER PUBLICATIONS

Pong et al., "Low power and compact reconfigurable multiplexing devices based on silicon microring resonators", Mar. 11, 2010, Optics Express, vol. 18, No. 10, pp. 9852-9858 (Year: 2010).*

(Continued)

*Primary Examiner* — Chad H Smith
(74) *Attorney, Agent, or Firm* — Sheppard Mullin Richter & Hampton LLP

(57) ABSTRACT

In the examples provided herein, a system includes an input waveguide, where a first end of the input waveguide is coupled to a light-emitting optical transmitter to allow the emitted light to enter the input waveguide, and a first ring resonator tunable to be resonant at a first resonant wavelength, wherein the first ring resonator is positioned near the input waveguide to couple a light at the first resonant wavelength from the input waveguide to the first ring resonator. The system also has a bus waveguide positioned to couple the light at the first resonant wavelength in the first ring resonator to the bus waveguide, and a mechanism to wavelength-tune the first ring resonator to a particular wavelength.

5 Claims, 12 Drawing Sheets

(51) Int. Cl.
*H04B 10/079* (2013.01)
*H04J 14/02* (2006.01)

(52) U.S. Cl.
CPC ....... *G02B 6/29395* (2013.01); *G02B 6/4215* (2013.01); *G02B 6/4286* (2013.01); *H04B 10/07957* (2013.01); *H04J 14/021* (2013.01)

(56) References Cited

U.S. PATENT DOCUMENTS

| | | | |
|---|---|---|---|
| 8,538,214 B2 | 9/2013 | Chen et al. | |
| 8,565,602 B2 | 10/2013 | Taylor et al. | |
| 8,891,922 B2* | 11/2014 | Krug | G02B 6/12007 385/50 |
| 2007/0258714 A1 | 11/2007 | Little et al. | |
| 2012/0051750 A1 | 3/2012 | Yano | |
| 2012/0251042 A1* | 10/2012 | Julien | H04Q 11/0005 385/17 |
| 2014/0126904 A1* | 5/2014 | Testa | H04J 14/0212 398/48 |
| 2014/0321848 A1* | 10/2014 | Sekiguchi | G02F 1/0123 398/38 |
| 2015/0104176 A1* | 4/2015 | Baehr-Jones | H04B 10/503 398/79 |
| 2015/0168803 A1* | 6/2015 | Xu | G02F 1/353 359/332 |

OTHER PUBLICATIONS

Poon et al. "Cascaded Microresonator-Based Matrix Switch for Silicon On-Chip Optical Interconnection", 8 Jul. 2009, Proceedings of the IEEE, vol. 97, No. 7, pp. 1216-1235 (Year: 2009).*
Zheng et al., "A tunable 1×4 silicon CMOS photonic wavelength multiplexer/demultiplexer for dense optical interconnects," Optics Express, vol. 18, No. 5, pp. 5151-5160.
International Search Report and Written Opinion received for PCT Patent Application No. PCT/US2015/065314, dated Jul. 29, 2016, 11 pages.
International Preliminary Report on Patentability received for PCT Patent Application No. PCT/US2015/065314, dated Jun. 21, 2018, 10 pages.
Ding et al., "A Compact Low-Power 320-Gb/s WDM Transmitter Based on Silicon Microrings," IEEE Photonics Journal, vol. 6, No. 3, Jun. 2014, 9 pages.

* cited by examiner

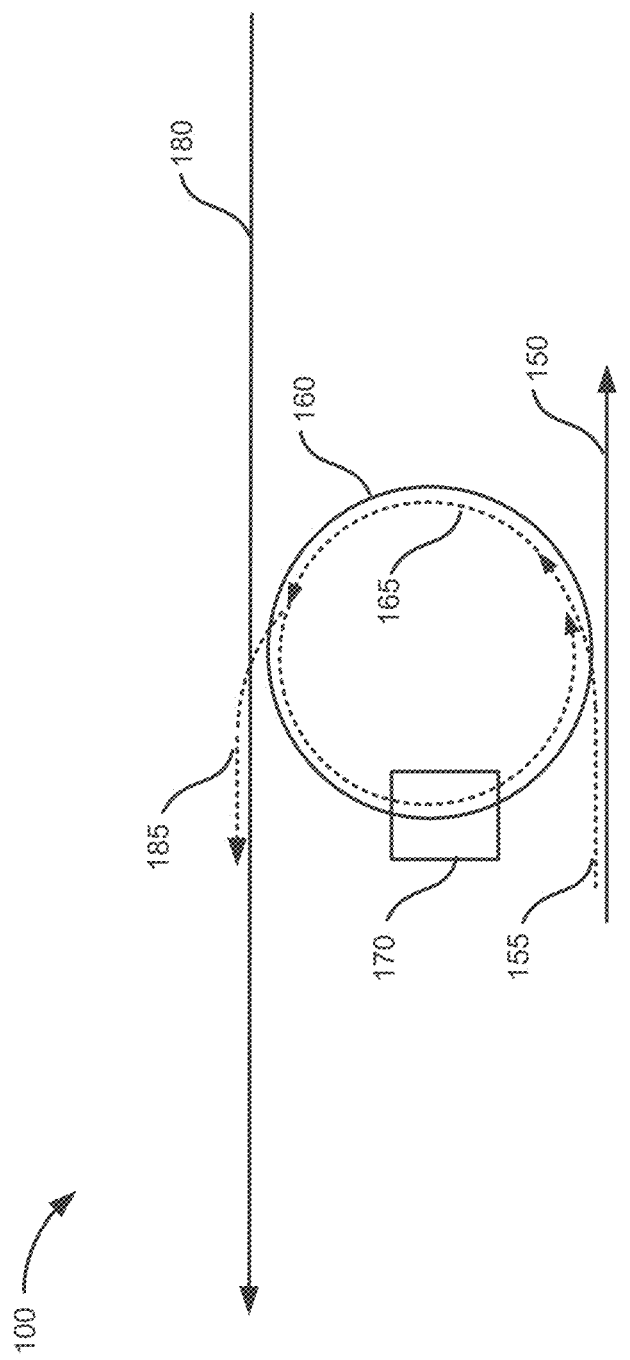

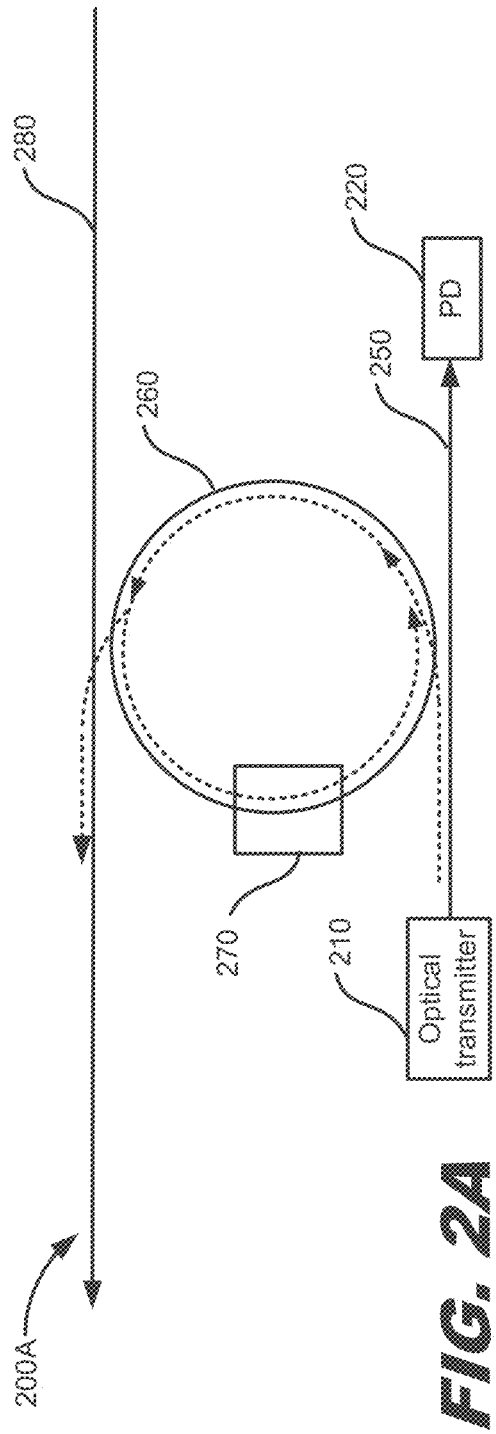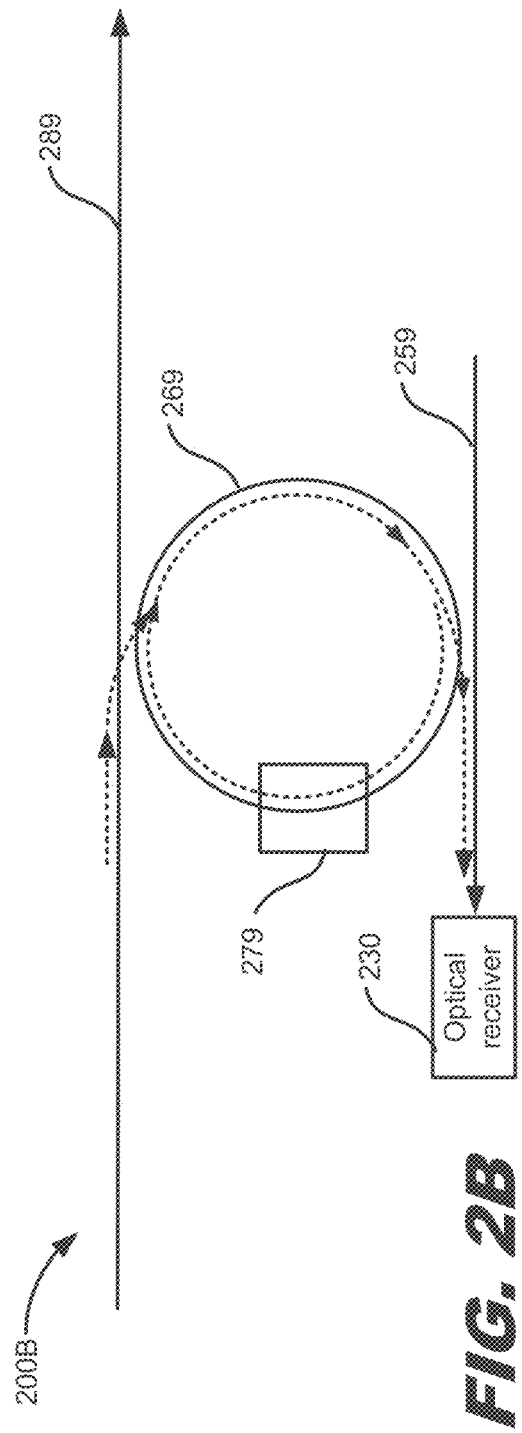
FIG. 2A
FIG. 2B

*FIG. 5C*

TUNABLE RING RESONATOR MULTIPLEXERS

BACKGROUND

A ring resonator is a waveguide formed in a closed loop. Light can be coupled from a second waveguide placed close to the ring resonator. At resonant wavelengths of the ring resonator, optical power from the second waveguide develops as a traveling wave in the ring resonator. However, light propagating at non-resonant wavelengths in the second waveguide continues to propagate with no coupling effect to the ring resonator. The resonant wavelength of the ring resonator can be tuned by changing the effective refractive index of the waveguide.

BRIEF DESCRIPTION OF THE DRAWINGS

The accompanying drawings illustrate various examples of the principles described below. The examples and drawings are illustrative rather than limiting.

FIG. 1 depicts an example ring-resonator-based multiplexer.

FIG. 2A depicts an example multiplexer system having a ring resonator, an optical transmitter, and a photodetector.

FIG. 2B depicts an example ring-resonator-based demultiplexer system having a ring resonator and an optical receiver.

FIG. 5C depicts tables showing example wavelength bands that may be transmitted and received by each of the transceiver nodes.

DETAILED DESCRIPTION

Figure 3:
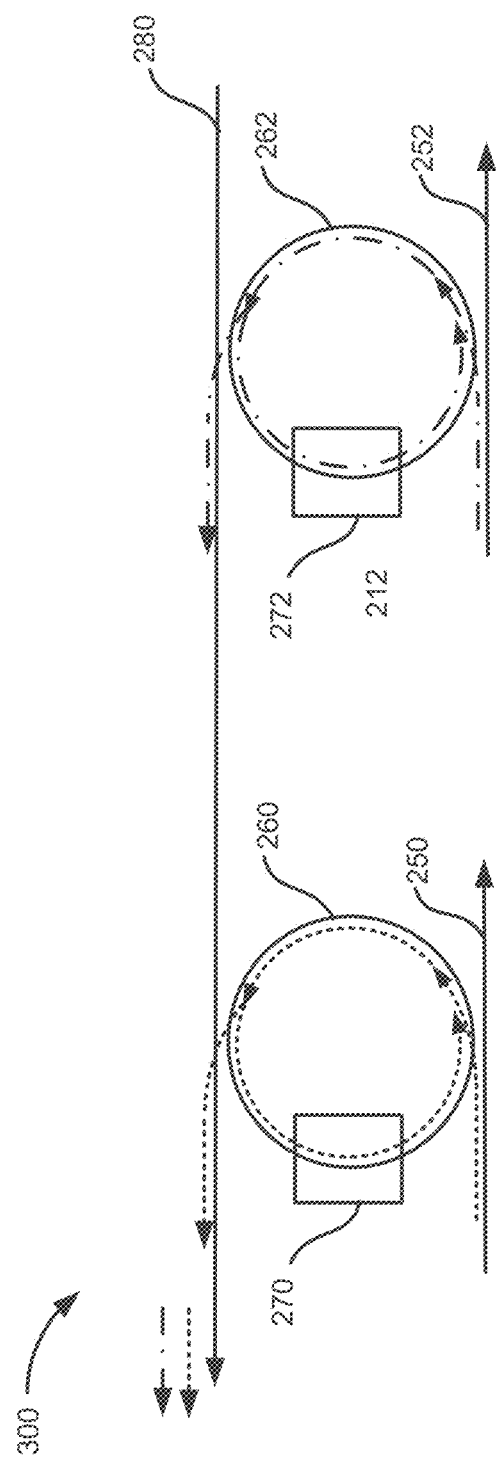
FIG. 3 depicts another example ring-resonator-based multiplexer.

Described below are ring-resonator-based multiplexers that allow different tunable wavelengths to be dropped onto a common bus waveguide. The ring resonator is tunable so that light from a tunable optical source can be multiplexed onto the bus waveguide. The ring resonator may also perform the function of modulating light from the optical source to carry a signal. Further, multiple ring resonators may be cascaded to increase the wavelength selectivity of the system.

FIG. 1 depicts an example ring-resonator-based multiplexer 100 that includes an input waveguide 150, a first ring resonator 160, a wavelength-tuning mechanism 170, and a bus waveguide 180. The wavelength-tuning mechanism 170 may be localized to a single region, multiple regions, or over the entire first ring resonator 160. In some implementations, some or all of the elements of the ring-resonator-based multiplexer 100 may be part of a photonic integrated circuit, for example, the input waveguide 150, the first ring resonator 160, and the bus waveguide 180 may be, but is not limited to, silica or silicon waveguides formed on a silicon substrate.

A first end of the input waveguide 150 may be coupled to a light-emitting optical transmitter (not shown) to allow light emitted by the transmitter to enter the input waveguide 150 and to propagate along the input waveguide 150.

The first ring resonator 160 may be positioned near the input waveguide 150. The first ring resonator 160 is a closed loop, where the shape of the loop may be, for example, circular, elliptical, or a racetrack shape. The first ring resonator 160 may have a resonant wavelength at a first wavelength to evanescently couple light at the first wavelength out of the input waveguide 150 into the first ring resonator 160, while light propagating in the input waveguide 150 at non-resonant wavelengths of the first ring resonator 160 continue propagating along the input waveguide 150 with no coupling effect to the first ring resonator 160.

The wavelength-tuning mechanism 170 may be used to tune the resonant wavelength of the first ring resonator 160. The mechanism 170 tunes the resonant wavelength by inducing a change in the refractive index of the first ring resonator 160 over a certain length, for example, by injecting carriers or changing the temperature of a portion or all of the ring resonator. In other words, wavelength-tuning the first ring resonator 160 changes an optical delay of the first ring resonator 160. In the example configuration of FIG. 1, by adjusting the resonant wavelength of the first ring resonator 160, light at the resonant wavelength is coupled from the input waveguide 150 to the first ring resonator 160.

The bus waveguide 180 may be positioned near the first ring resonator 160 to couple light out of the first ring resonator 160 into the bus waveguide 180. Thus, light at the resonant wavelength of the first ring resonator 160 is coupled from the input waveguide 150 by the first ring resonator 160 is subsequently coupled or multiplexed onto the bus waveguide 180. Any light propagating in the bus waveguide 180 at wavelengths different from the resonant wavelength of the first ring resonator 160 continues propagating along the bus waveguide 180.

In some implementations, the optical transmitter may be a tunable optical source, such as a tunable laser. When the emitting wavelength of the optical transmitter is changed, the first ring resonator 160 may be tuned using the wavelength-tuning mechanism 170 to couple the emitted wavelength from the input waveguide 150 and to multiplex the light at the emitted wavelength to the bus waveguide 180.

In some implementations, the optical transmitter may emit continuous-wave light. Then the mechanism 170 may be used to modulate the resonant wavelength of the first ring resonator 160 so that the light at the first resonant wavelength coupled into the first ring resonator carries data.

FIG. 2A depicts an example ring-resonator-based multiplexer system 200A having an input waveguide 250, a ring resonator 260 with a wavelength-tuning mechanism 270, a bus waveguide 280, an optical transmitter 210, and a photodetector 220.

The optical transmitter 210 may be coupled to a first end of input waveguide 250 so that light emitted by the optical transmitter 210 propagates down the input waveguide 250. A photodetector 220 may be coupled to a second end, opposite to the first end, of the input waveguide 250 to detect an optical power of the light in the input waveguide 250. The detected power level of the light in the input waveguide 220 may be used to tune the resonant wavelength of the ring resonator 260 using the wavelength-tuning mechanism 270. For example, if light emitted by the optical transmitter 210 at a first wavelength is to be multiplexed onto the bus waveguide 280, the light at the first wavelength detected by the photodetector 220 should be minimized, corresponding to a maximum coupling of light at the first wavelength to the ring resonator 260 and subsequently coupled to the bus waveguide 280.

The ring-resonator-based multiplexer system 200A may be operated in reverse as a demultiplexer system. FIG. 2B depicts an example ring-resonator-based demultiplexer system 200B having a bus waveguide 289, a ring resonator 269, a wavelength-tuning mechanism 279, an output waveguide 259, and an optical receiver 230.

Light at one or more wavelengths may propagate down the bus waveguide 289. The ring resonator 269 may be positioned near the bus waveguide 289. The ring resonator 269 may have a resonant wavelength at a first wavelength to evanescently couple light at the first wavelength out of the bus waveguide 289 into the ring resonator 269, while light propagating in the bus waveguide 289 at non-resonant wavelengths of the ring resonator 269 continue propagating along the bus waveguide 289 with no coupling effect to the ring resonator 269.

The resonant wavelength of the ring resonator 269 may be tuned with tuning mechanism 279 so that the light coupled out of or demultiplexed from the bus waveguide 289 may be changed. The output waveguide 259 may be positioned near the ring resonator 269 to couple light out of the ring resonator 269 into the output waveguide 259.

The optical receiver 230 may be coupled to an end of the output waveguide 259 to detect an optical power of the demultiplexed light coupled to the output waveguide 259. The optical receiver 230 may also convert the detected light to an electrical signal.

FIG. 3 depicts an example ring-resonator-based multiplexer 300 capable of multiplexing two signals at different wavelengths onto a bus waveguide. As with the multiplexer 100 of FIG. 1, the ring-resonator-based multiplexer 300 includes a first input waveguide 250, where a first end of the input waveguide 250 may be coupled to a light-emitting optical transmitter (not shown) to allow the emitted light to enter the input waveguide 250; a first ring resonator 260 tunable to be resonant at a first resonant wavelength, where the first ring resonator 260 is positioned near the input waveguide 250 to couple light at the first resonant wavelength from the input waveguide 250 to the first ring resonator 260; a bus waveguide 280, where the bus waveguide 280 is positioned to couple the light at the first resonant wavelength in the first ring resonator 260 to the bus waveguide 280; and a wavelength-tuning mechanism 270 to wavelength-tune the first ring resonator 260 to a particular resonant wavelength. When the first ring resonator 260 is detuned from the first resonant wavelength, the light at the first resonant wavelength is not coupled from the input waveguide 250 to the first ring resonator 260.

Additionally, the ring-resonator-based multiplexer 300 includes an additional input waveguide 252, where a first end of the additional input waveguide 252 may be coupled to an additional light-emitting optical transmitter (not shown) to allow the additional light from the additional optical transmitter to enter the additional input waveguide 252; an additional ring resonator 262 tunable to be resonant at a second resonant wavelength different from the first resonant wavelength, where the additional ring resonator 262 is positioned near the additional input waveguide 252 to couple the additional light at the second resonant wavelength from the additional input waveguide 252 to the additional ring resonator 262; and an additional mechanism 272 to wavelength-tune the resonant wavelength of the additional ring resonator 262. The bus waveguide 280 is positioned to couple the additional light at the second resonant wavelength from the additional ring resonator 262 to the bus waveguide 280. Thus, the system 300 may multiplex two signals at different wavelengths onto a bus waveguide.

Figure 4A:
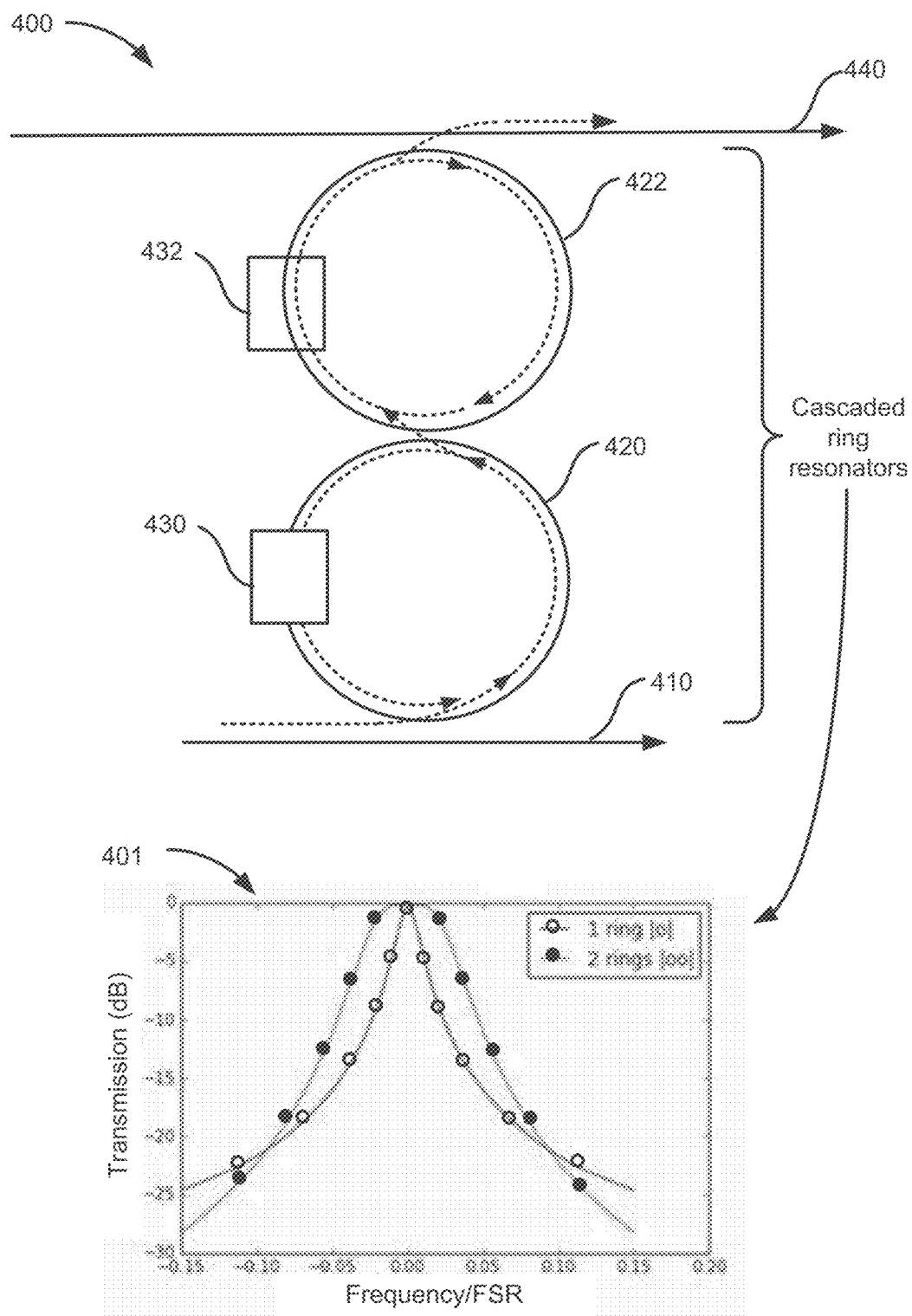
FIG. 4A depicts an example ring-resonator-based multiplexer with cascaded ring resonators, and includes an example plot of transmission as a function of frequency/free spectral range (FSR) for two cascaded ring resonators.

FIG. 4A depicts an example ring-resonator-based multiplexer 400 with cascaded ring resonators 420, 422, and includes an example plot of transmission as a function of frequency/free spectral range (FSR) for two cascaded ring resonators. The ring-resonator-based multiplexer system 400 is similar to the multiplexer system 100 shown in FIG. 1, however, there are two cascaded ring resonators 420, 422, rather than a single ring resonator.

Light may be propagating along the input waveguide 410. A first ring resonator 420 tunable to be resonant at a first resonant wavelength is positioned near the input waveguide 410 to couple light at the first resonant wavelength from the input waveguide 410 to the first ring resonator 420. A first wavelength-tuning mechanism 430 may be used to wavelength-tune the resonant wavelength of the first ring resonator 420.

A second ring resonator 422 tunable to be resonant at the first resonant wavelength is positioned near the first ring resonator 420 to couple light at the first resonant wavelength from the first ring resonator 420 to the second ring resonator 422. A second wavelength-tuning mechanism 432 may be used to wavelength-tune the resonant wavelength of the second ring resonator 422.

A bus waveguide 440 may be positioned near the second ring resonator 422 to couple the light at the first resonant wavelength in the second ring resonator 422 to the bus waveguide 440.

An optical delay of the first ring resonator 420 may be the same as or different from an optical delay of the second ring resonator 422.

The cascaded ring resonators each has a cavity size that corresponds to an optical period or free spectral range. A longer ring resonator corresponds to a shorter period. For the case where there are two cascaded ring resonators 420, 422, and the ring resonators 420, 422 have the same cavity size, a plot 401 of transmission as a function of frequency/free spectral range (FSR) is shown on the bottom of FIG. 4A. Note that for two cascaded ring resonators (graphed line with solid circles), the bandpass is broadened and has a steeper slope in the filter response, as compared to a single ring resonator (graphed line with open circles). While two cascaded ring resonators 420, 422 are shown in the example of FIG. 4, any number of ring resonators may be cascaded together. If three or more ring resonators are cascaded, the bandpass would be correspondingly broader with yet steeper slopes.

Figure 4B:
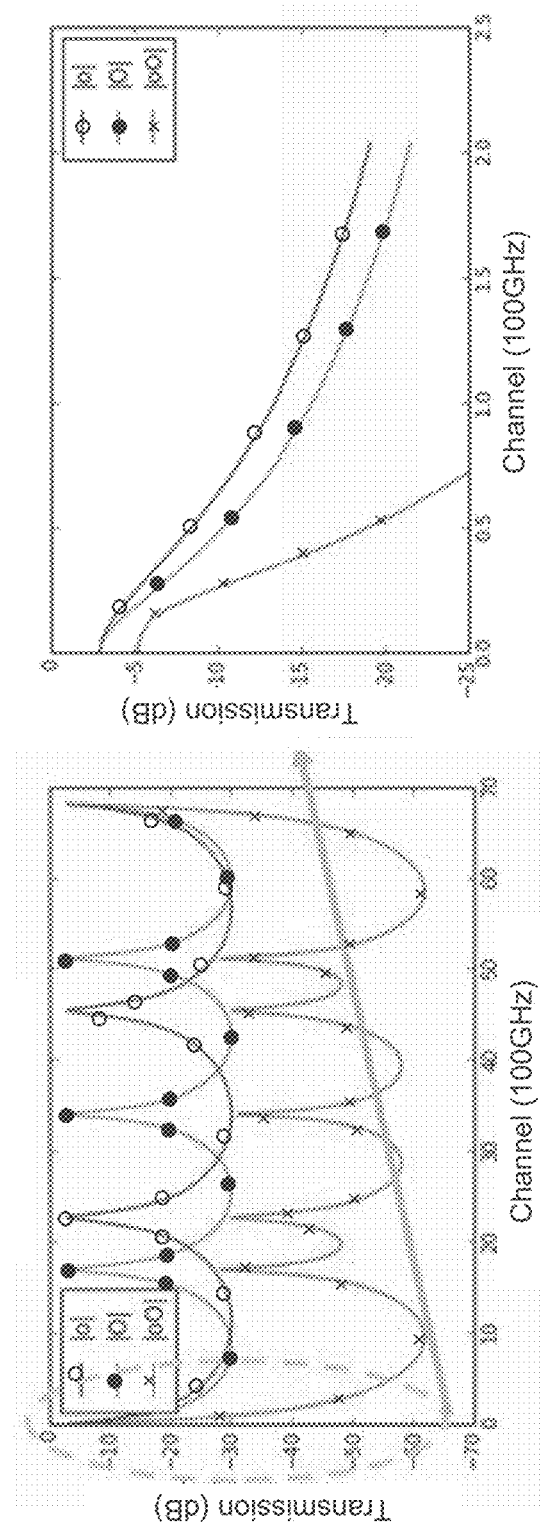
FIG. 4B depicts an example plot of transmission as a function of frequency/free spectral range (FSR) for two cascaded ring resonators used in a polarization diverse receiver system.

As discussed above, longer ring resonators have shorter periods. For optical communication systems where it is desirable to include more channels, the system should have larger periods, which means that the cavity of the ring resonators should be smaller. However, beyond a minimum bend radius, the loss in the ring resonator increases to an unacceptable level. Another way to obtain a longer period is to cascade two ring resonators having different delays, and the effective period is the least common multiple of the individual periods of the two ring resonators. For the case where there are two cascaded ring resonators 420, 422, and the ring resonators 420, 422 have different delays, an example plot of transmission as a function of frequency/free spectral range (FSR) is shown in FIG. 4B. The plot compares transmission as a function of the number of channels for a ring resonator with a smaller cavity (graphed line with open circle), a ring resonator with a larger cavity (graphed line with solid circle), and a cascade of the two different sizes of ring resonators (graphed line with x). The expanded plot of the right of FIG. 4B shows that the bandpass is wider with steeper slopes for the cascaded ring resonators as compared to the individual ring resonators.

Thus, in some implementations, the cascaded ring resonators may include any optical delay. The larger the number of ring resonators, the higher the order of the optical filter. Further, some or all of the plurality of ring resonators may have a different delay.

In some implementations, a resonant wavelength-tuning mechanism may be used, for example, a temperature adjusting device, such as a heater, to tune each ring resonator in a cascade of resonators to the same resonant wavelength. Additionally, the ring resonators in the cascade of resonators may also be tuned as a group.

Arrayed Waveguide Grating (AWG) Applications

An AWG may be an M×N port device, where M is the number of input ports and N is the number of output ports. Light at different wavelengths entering each of the input ports may be demultiplexed into different output ports. When the AWG is operated in the reverse direction, light entering the output ports may be multiplexed and exit through the input ports.

An AWG operates based upon constructive and destructive interference. Light entering one of the input ports is coupled into a first cavity, and then the light from the first cavity is coupled to one end of an array of waveguides. The length of each waveguide in the array increases across the array, such that the optical path length difference between neighboring waveguides introduces wavelength-dependent phase delays. The other end of the array of waveguides is coupled to a second cavity, and light from the second cavity is coupled to the output ports of the AWG via a series of waveguides. Constructive interference occurs when the optical path length difference of the array of waveguides is equal to an integer number of wavelengths. As a result, different wavelengths of light are focused by the AWG into different ones of the output ports. The AWG has a free spectral range (FSR) that characterizes the periodicity of the demultiplexer. The periodic property arises because constructive interference at the output ports can arise for wavelengths that are spaced by a free spectral range.

Figure 5A:
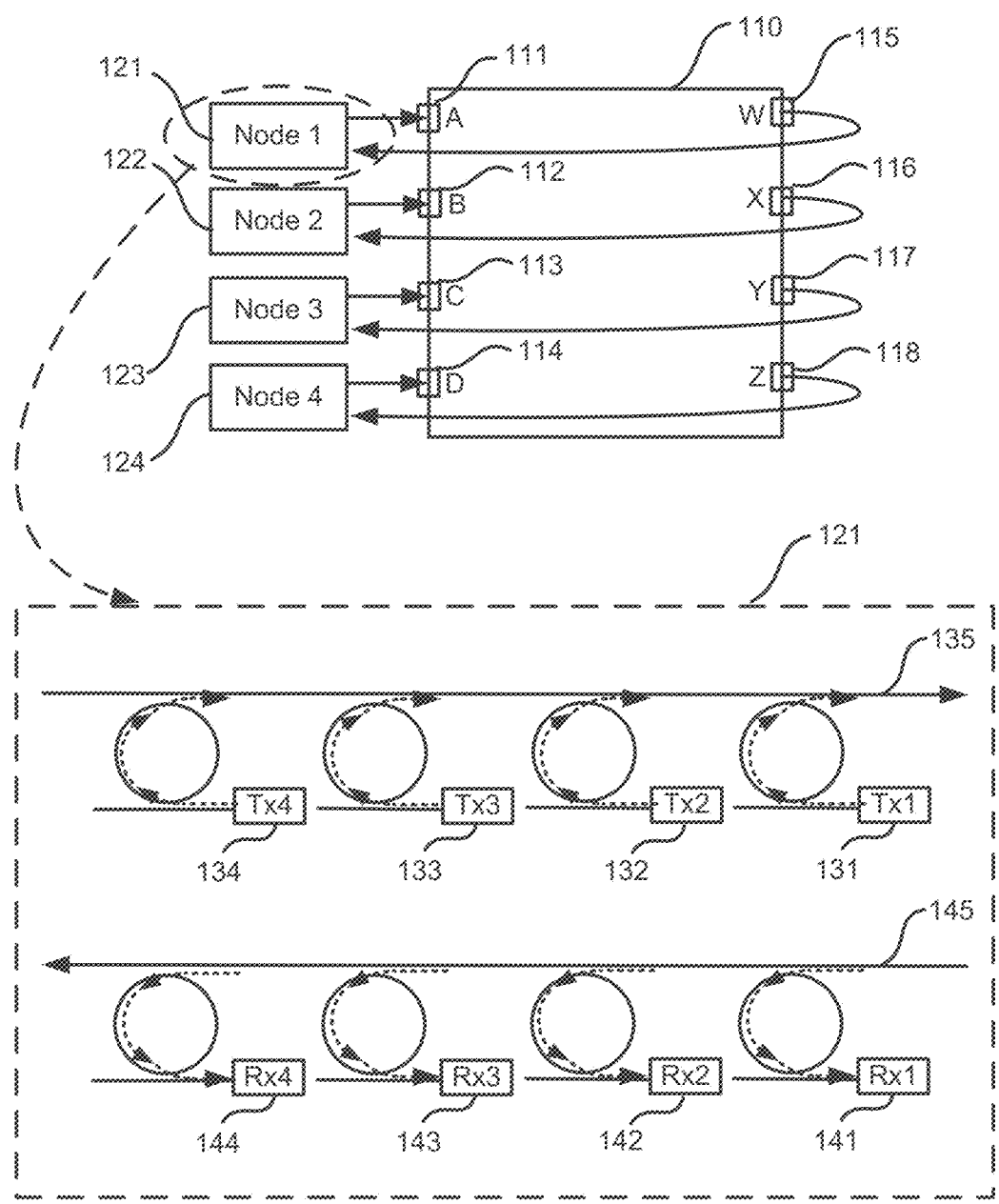
FIG. 5A depicts an example reconfigurable photonic network that uses a multiplexer and a demultiplexer, each based on ring resonators.

FIG. 5A depicts an example reconfigurable photonic network having multiple transceiver nodes 121-124 coupled to the input ports 111-114 and output ports 115-118 of an AWG 110. In the example of FIG. 5A, the AWG 110 has four input ports 111-114 and four output ports 115-118, however, an AWG in a reconfigurable photonic network may have any number of input ports and any number of output ports. For convenience, the input ports 111-114 of the AWG 110 are labeled A 111, B 112, C 113, and D 114, while the output ports 115-118 are labeled W 115, X 116, Y 117, and Z 118.

Four transceiver nodes 121-124 are shown in the example of FIG. 5A, however, any number of transceiver nodes may be used in the reconfigurable photonic network. As shown in the inset of FIG. 5A, a transceiver node may include, but is not limited to, tunable optical transmitters 131-134, receivers 141-144, a ring-resonator-based multiplexer, and a ring-resonator-based demultiplexer. In some implementations, a transceiver node may be part of a larger component, subsystem, or system, and may include, but is not limited to, switches, processing elements, and/or data storage elements.

While four tunable transmitters 131-134 and four receivers 141-144 are shown in the inset, any number of tunable transmitters and receivers may be used with a corresponding ring resonator for each transmitter and receiver. An electrical input may enter each transmitter 131-134, the optical outputs of the transmitters 131-134 may be multiplexed onto an output bus waveguide 135, such as an optical fiber. An input bus waveguide 145, such as an optical fiber, may carry multiplexed optical signals in different wavelength bands, and be demultiplexed by the ring resonators and sent to different receivers 141-144, and an electrical output may exit each of the receivers 141-144.

The tunable transmitters 131-134 are optical transmitters that emit light at a central wavelength over a narrow band of wavelengths, referred to as a wavelength channel, and the wavelength of the emitted light should be tunable over a range of wavelengths across multiple wavelength channels. In some implementations, the tunable transmitter 131-134 may be a tunable laser, such as a vertical cavity surface emitting laser (VCSEL) or distributed feedback semiconductor laser (DFB), that may be tuned, for example, through the use of a heating element. In some implementations, each tunable transmitter 131-134 located within a single transceiver node 121-124 may emit light in a different wavelength band. In some implementations, each tunable transmitter 131-134 located within a single transceiver node 121-124 may emit light in the same wavelength band. In some implementations, some tunable transmitters 131-134 located within a single transceiver node 121-124 may emit light in overlapping wavelength bands.

Figure 5B:
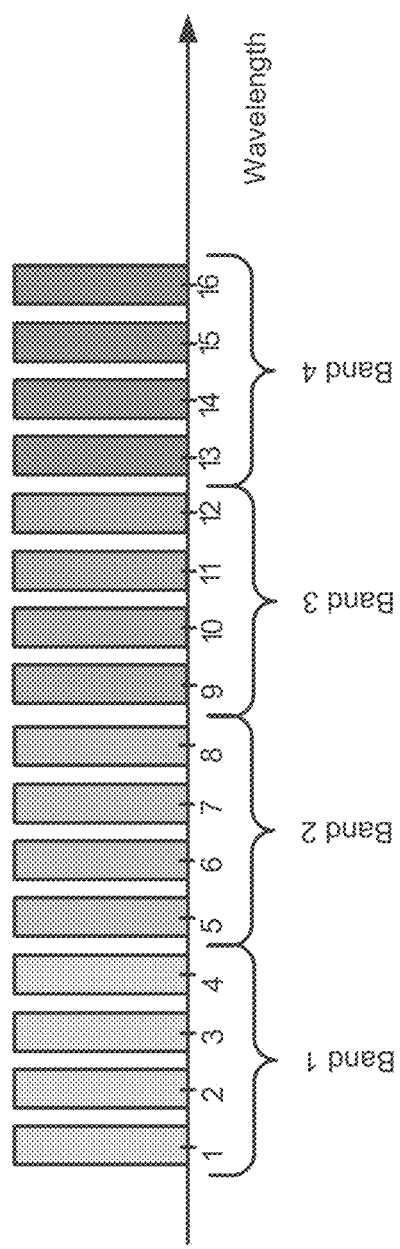
FIG. 5B depicts example wavelength channels and wavelength bands that a transceiver node may transmit and receive.

FIG. 5B depicts example wavelength channels and wavelength bands that a transceiver node 121-124 may transmit and receive. Sixteen evenly spaced wavelength channels, labeled 1 through 16 are shown in the graph, however, in some implementations, some wavelength channels may be skipped. In some implementations, the wavelength channels may coincide with some of the wavelength channels on the wavelength grid specified by the ITU (International Telecommunication Union), where the wavelength channels are spaced by 100 GHz. In FIG. 5B, the first four wavelength channels, labeled 1-4, fall within band 1; the second four wavelength channels, labeled 5-8, fall within band 2; the third four wavelength channels, labeled 9-12, fall within band 3; and the fourth four wavelength channels, labeled 13-16, fall within band 4. In some implementations, the wavelength range spanned by one of the bands may be a FSR of the AWG. In some implementations, the wavelength range spanned by one of the bands may include portions of one or multiple FSRs of the AWG.

Figure 5C:
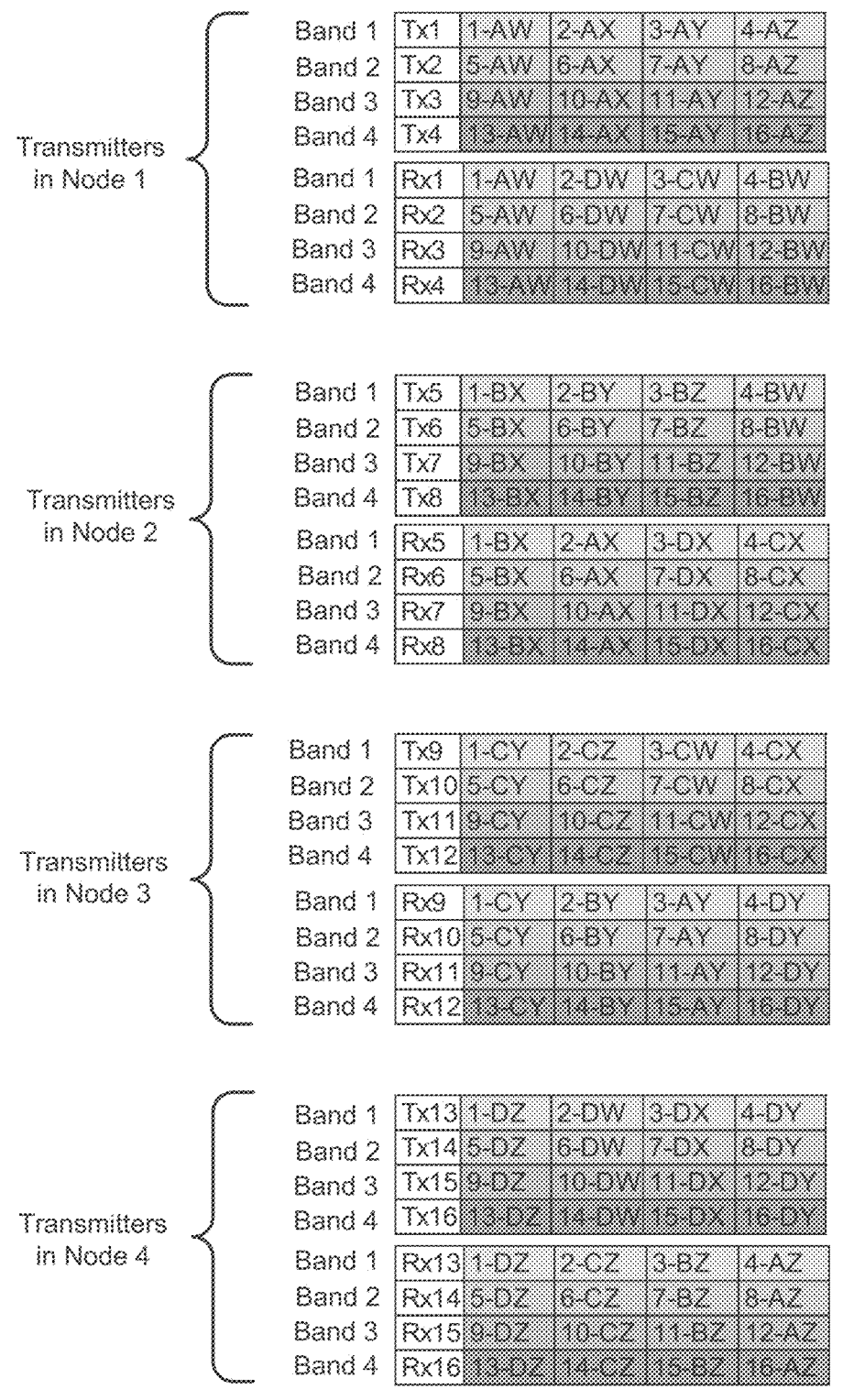

FIG. 5C depicts tables showing example wavelength bands that may be transmitted and received by each of the transceiver nodes 121-124. In the transmitter tables, transmitters are labeled as Txn, where n is the number of the transmitter, and following each Txn transmitter label is a row of four possible wavelength channels to which the transmitter may be tuned. Each indicated wavelength channel in FIG. 5C is part of an indicator in the format K-MN, where K is the emission wavelength channel (1-16 in this example), M is the input port (A-D in this example) of the AWG to which the transmitter output is coupled, and N is the output port (W-Z in this example) of the AWG to which the transmitter output is routed.

In some examples, for node 1 121, the emission wavelength of transmitter 1 (Tx1) may be tuned to one of the four wavelength channels 1, 2, 3, 4 in band 1, and the output of the transmitter may be multiplexed to an optical waveguide, such as an optical fiber, coupled to port A 111 of the AWG 110. If the wavelength is tuned to wavelength channel 1, the light may be routed to output port W 115 of the AWG 110, as indicated by '1-AW'; if the wavelength is tuned to wavelength channel 2, the light may be routed to output port X 116 of the AWG 110, as indicated by '2-AX'; if the wavelength is tuned to wavelength channel 3, the light may be routed to output port Y 117 of the AWG 110, as indicated by '3-AY'; and if the wavelength is tuned to wavelength channel 4, the light may be routed to output port A 118 of the AWG 110, as indicated by '4-AZ'. Similarly, in some examples, transmitter 2 (Tx2) may be tuned to one of four wavelength channels 5, 6, 7, 8 in band 2; transmitter 3 (Tx3) may be tuned to one of four wavelength channels 9, 10, 11, 12 in band 3; and transmitter 4 (Tx4) may be tuned to one of four wavelength channels 13, 14, 15, 16 in band 4. The outputs of the four transmitters may be multiplexed onto output waveguide 135 via ring resonators and sent to input port A 111 of the AWG 110.

The transmitters in the other nodes, node 2 122, node 3 123, and node 4 124, may operate similarly, where each of the transmitters may be tuned to one of four wavelength channels. The light emitted by the four transmitters in each node may be multiplexed together using tunable ring resonators and sent to a different input node of the AWG. The multiplexed output from node 2 122 may be coupled to input node B 112 of the AWG; the multiplexed output from node 3 123 may be coupled to input node C 113 of the AWG; and the multiplexed output from node 4 124 may be coupled to input node D 114 of the AWG.

If the wavelength range spanned by each of the bands 1, 2, 3, 4 coincides with the FSR of the AWG, wavelength channels 1, 5, 9, 13 are each separated by a FSR, and thus, are routed to the same output port of the AWG when entering the AWG at the same input port. Similarly, if wavelength channels 2, 6, 10, 14 are each separated by a FSR, they are routed to the same output port of the AWG when entering the AWG at the same input port; if wavelength channels 3, 7, 11, 15 are each separated by a FSR, they are routed to the same output port of the AWG when entering the AWG at the same input port; and if wavelength channels 4, 8, 12, 16 are each separated by a FSR, they are routed to the same output port of the AWG when entering the AWG at the same input port.

Returning to node 1 121, an optical waveguide, such as an optical fiber, couples the output port W 115 of the AWG 110 to a ring-resonator-based demultiplexer that separates out the light exiting output node W 115 into four bands: light from band 1 may be directed to receiver Rx1, light from band 2 may be directed to receiver Rx2, light from band 3 may be directed to receiver Rx3, and light from band 4 may be directed to receiver Rx4.

FIG. 5C also depicts example receiver tables for each of the transceiver nodes 121-124 in a similar format as for the transmitter tables. In the receiver tables, receivers are labeled as Rxn, where n is the number of the receiver, and following each Rxn receiver label is a row of four possible wavelength channels that the receiver may receive from a ring-resonator-based demultiplexer. Each wavelength is part of an indicator in the format K-MN, where K is the received wavelength channel (1-16 in this example), M is the input port (A-D in this example) of the AWG from which the light was routed, and N is the output port (W-Z in this example) of the AWG to which the receiver's ring-resonator-based demultiplexer is coupled.

As indicated in the example receiver table for node 1 121 in FIG. 5C, receiver Rx1 may receive wavelengths in band 1: wavelength channel 1 from input node A 111 of the AWG; wavelength channel 2 from input node D 114 of the AWG; wavelength channel 3 from input node C 113 of the AWG; and wavelength channel 4 from input node B 112 of the AWG. Receiver Rx2 may receive wavelengths in band 2: wavelength channel 5 from input node A 111 of the AWG; wavelength channel 6 from input node D 114 of the AWG; wavelength channel 7 from input node C 113 of the AWG; and wavelength channel 8 from input node B 112 of the AWG. Receiver Rx3 may receive wavelengths in band 3: wavelength channel 9 from input node A 111 of the AWG; wavelength channel 10 from input node D 114 of the AWG; wavelength channel 11 from input node C 113 of the AWG; and wavelength channel 12 from input node B 112 of the AWG. Receiver Rx4 may receive wavelengths in band 4: wavelength channel 13 from input node A 111 of the AWG; wavelength channel 14 from input node D 114 of the AWG; wavelength channel 15 from input node C 113 of the AWG; and wavelength channel 16 from input node B 112 of the AWG.

Similarly, in node 2 122, receivers Rx5, Rx6, Rx7, Rx8 may be coupled via a ring-resonator-based demultiplexer to output port X 116 of the AWG 110; in node 3 123, receivers Rx9, Rx10, Rx11, Rx12 may be coupled via a ring-resonator-based demultiplexer to output port Y 117 of the AWG 110; and in node 4 124, receivers Rx13, Rx14, Rx15, Rx16 may be coupled via a ring-resonator-based demultiplexer to output port Z 118 of the AWG 110. Also, receivers Rx5 in node 2 122, Rx9 in node 3 123, and Rx13 in node 4 124 may receive wavelengths in band 1; receivers Rx6 in node 2 122, Rx10 in node 3 123, and Rx14 in node 4 124 may receive wavelengths in band 2; receivers Rx7 in node 2 122, Rx11 in node 3 123, and Rx15 in node 4 124 may receive wavelengths in band 3; and receivers Rx8 in node 2 122, Rx12 in node 3 123, and Rx16 in node 4 124 may receive wavelengths in band 4.

In some implementations, each of receivers Rx1, Rx2, Rx3, Rx4 may be identical and capable of detecting light in any of the wavelength bands 1, 2, 3, 4, for example, a photodetector or a charge-coupled device (CCD).

The ring-resonator-based multiplexers and demultiplexers used in an AWG application may include multiple cascaded ring resonators corresponding to each transmitter and/or receiver, for example, as shown in FIG. 4A, rather than a single ring resonator. In some implementations, a resonant wavelength-tuning mechanism may be used, for example, a temperature adjusting device, such as a heater, to tune each ring resonator in the cascade of resonators to the same resonant wavelength. Alternatively or additionally, the ring resonators in the cascade of resonators may also be tuned as a group.

Figure 6:
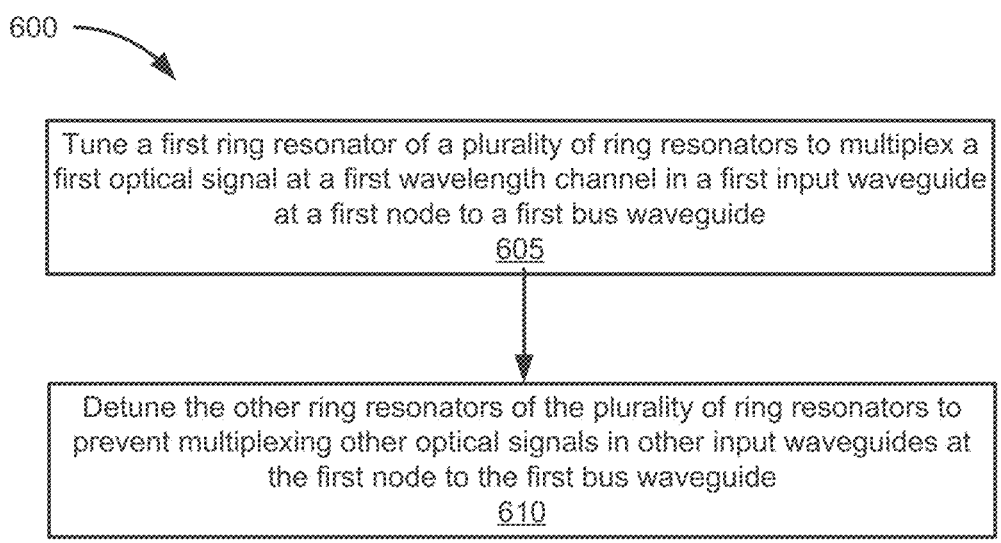
FIG. 6 depicts a flow diagram illustrating an example process of multiplexing data onto a bus waveguide.

FIG. 6 depicts a flow diagram illustrating an example process 600 of multiplexing data onto a bus waveguide coupled to an input port of an arrayed waveguide grating.

The process begins at block 605, where a first ring resonator of a plurality of ring resonators may be tuned to multiplex a first optical signal at a first wavelength channel in a first input waveguide at a first node to a first bus waveguide. The tuned first ring resonator is positioned to couple the first optical signal from the first input waveguide to the first ring resonator, and the first ring resonator is also positioned to couple the first optical signal from the first ring resonator to the first bus waveguide. Further, an end of the first bus waveguide is coupled via an optical waveguide to an input port of a plurality of input ports of a first arrayed waveguide grating (AWG). Additionally, the first optical signal is routed to a first output port of a plurality of output ports of the first AWG based on the first wavelength channel and is transmitted via an optical waveguide to a second bus waveguide in a second node.

At block 610, the other ring resonators of the plurality of ring resonators may be detuned to prevent multiplexing of other optical signals in other input waveguides at the first node to the first bus waveguide. Each of the other ring resonators, tuned to a corresponding respective ring resonator's resonant wavelength, is positioned to couple one of the other optical signals from one of the other input waveguides via the respective other ring resonator, and to couple the one of the other optical signals to the first bus waveguide via the respective other ring resonator.

In some implementations, tuning includes changing an optical delay of the first ring resonator.

Figure 7:
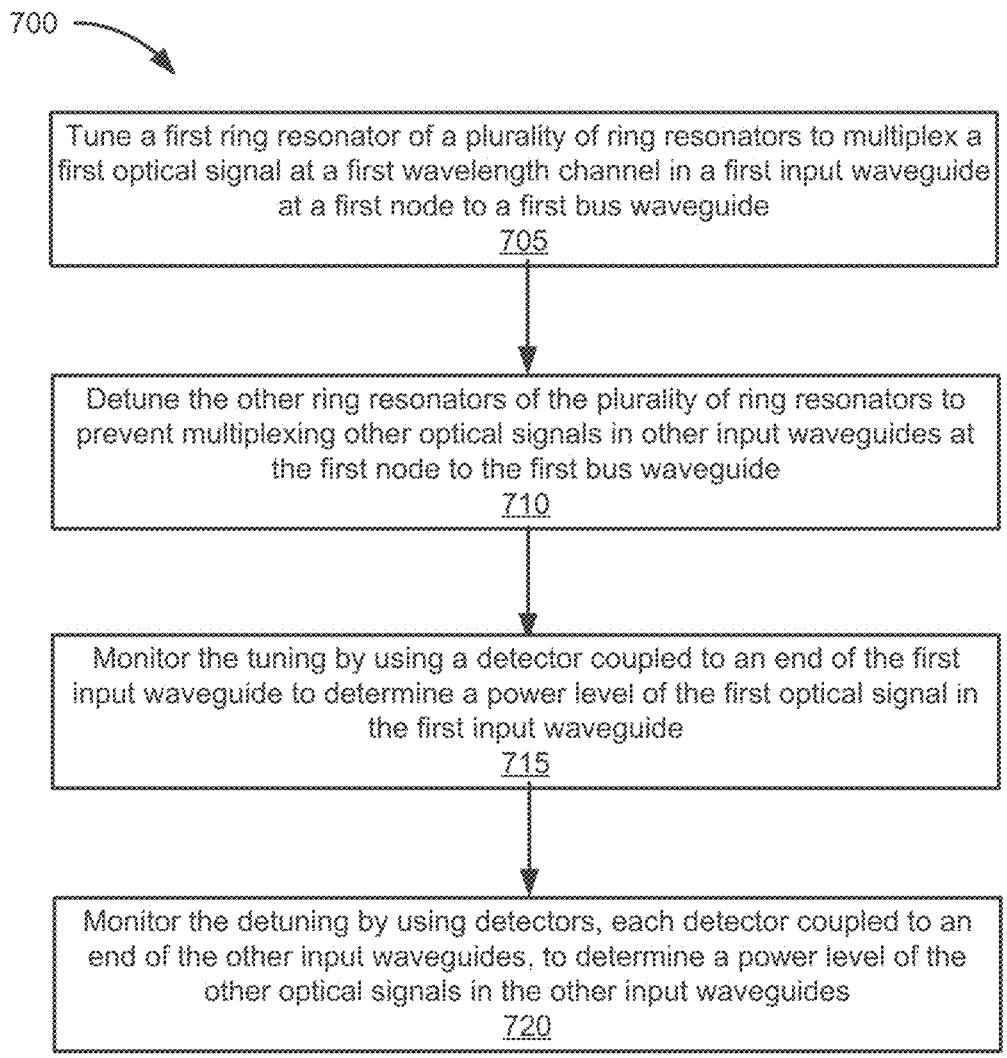
FIG. 7 depicts a flow diagram illustrating another example process of multiplexing data onto a bus waveguide.

FIG. 7 depicts a flow diagram illustrating another example process 700 of multiplexing data onto a bus waveguide coupled to an input port of an arrayed waveguide grating via optical waveguide.

The process begins at block 705 which may be similar to block 605 described with respect to process 600 of FIG. 6. Block 710 may also be similar to block 610 of FIG. 6.

At block 715, the tuning may be monitored by using a detector coupled to an end of the first input waveguide to determine a power level of the first optical signal in the first input waveguide.

At block 720, the detuning may be monitored by using detectors, each detector coupled to an end of the other input waveguides, to determine a power level of the other optical signals in the other input waveguides. In some implementations, a subset of the other input waveguides may be monitored using detectors.

Figure 8:
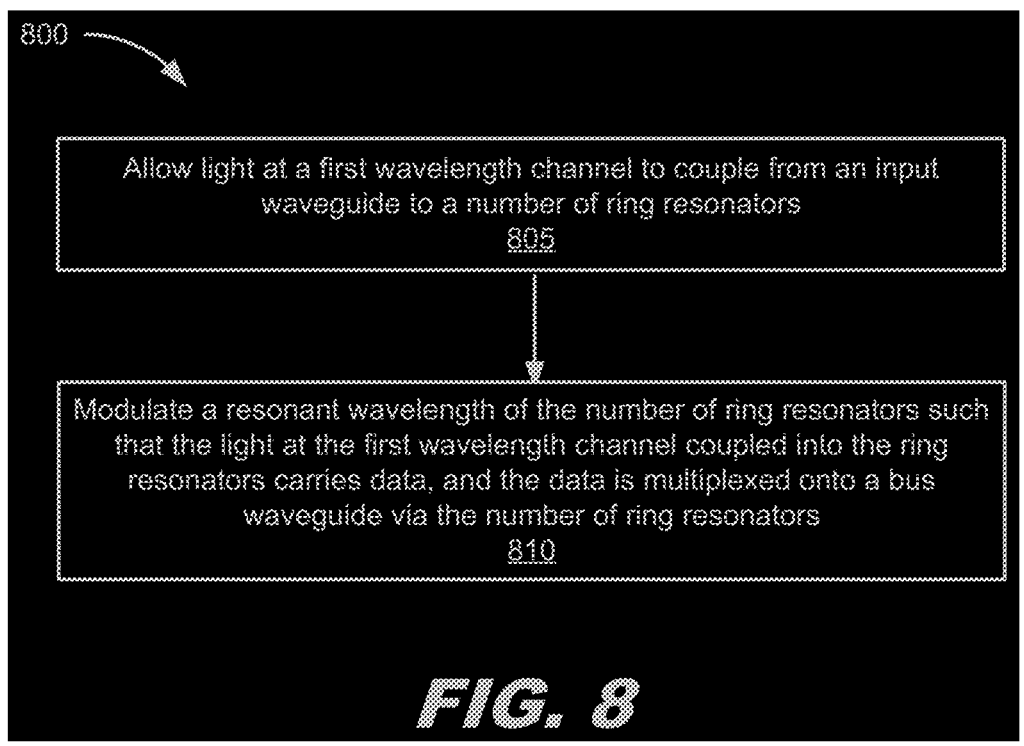
FIG. 8 depicts a flow diagram illustrating another example process of multiplexing data onto a bus waveguide.

FIG. 8 depicts a flow diagram illustrating another example process 800 of multiplexing data onto a bus waveguide.

The process begins at block 805, where light at a first wavelength channel may be allowed to couple from an input waveguide to a number of ring resonators.

At block 810, a resonant wavelength of the number of ring resonators may be modulated such that the light at the first wavelength channel coupled into the ring resonators carries data, and the data is multiplexed onto a bus waveguide via the number of ring resonators. Each of the number of ring resonators is resonant at a same wavelength.

In some implementations, the number of ring resonators may be modulated independently, while in other implementations, the number of ring resonators may be modulated as a group. The number of ring resonators are positioned such that the first wavelength channel from a first ring resonator couples sequentially via each of the number of ring resonators to a last of the number of ring resonators, and the first ring resonator is positioned near the input waveguide to couple the optical signal at the first wavelength channel in the first input waveguide to the first ring resonator. Further, the bus waveguide is positioned near the last ring resonator to multiplex the optical signal at the first wavelength channel in the last ring resonator to the bus waveguide.

Figure 9:
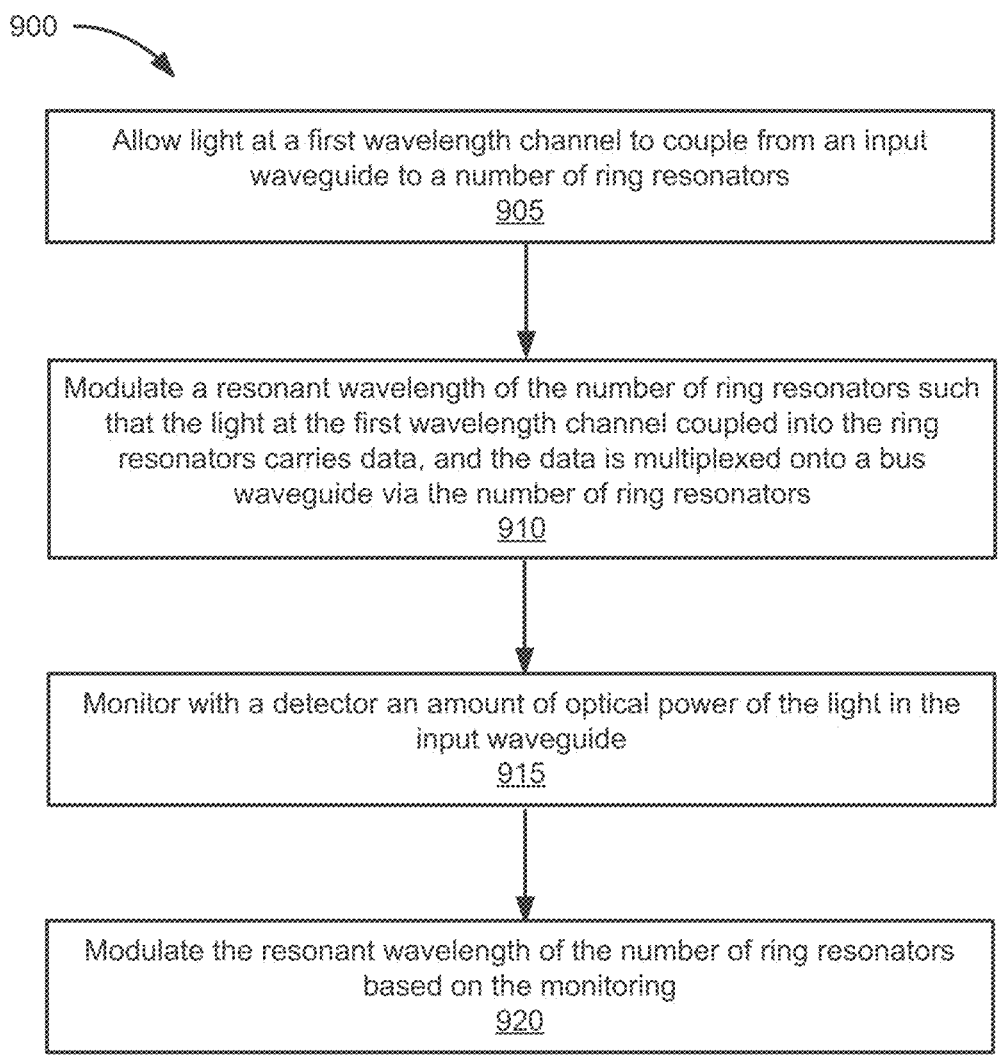
FIG. 9 depicts a flow diagram illustrating another example process of multiplexing data onto a bus waveguide.

FIG. 9 depicts a flow diagram illustrating another example process 900 of multiplexing data onto a bus waveguide.

The process begins at block 905 which may be similar to block 805 described with respect to process 800 of FIG. 8. Block 910 may also be similar to block 810 of FIG. 8.

At block 915, an amount of optical power of the light in the input waveguide may be monitored with a detector.

At block 920, the resonant wavelength of the number of ring resonators may be modulated based on the monitoring.

Not all of the steps or features presented above are used in each implementation of the presented techniques. Steps may be performed in a different order than presented.

As used in the specification and claims herein, the singular forms "a," "an," and "the" include plural referents unless the context clearly dictates otherwise.

What is claimed is:

1. A multiplexing method comprising:
tuning a first ring resonator of a plurality of ring resonators to multiplex a first optical signal at a first wavelength channel in a first input waveguide at a first node to a first bus waveguide,
wherein tuning the first ring resonator comprises using a mechanism to wavelength-tune the first ring resonator to the first wavelength channel and using a detector directly coupled to an end of the first input waveguide to determine an optical power level of the first optical signal in the first input waveguide,
wherein the tuned first ring resonator is positioned to couple the first optical signal from the first input waveguide to the first ring resonator, and the first ring resonator is also positioned to couple the first optical signal from the first ring resonator to the first bus waveguide, and
wherein an end of the first bus waveguide is coupled via an optical waveguide to an input port of a plurality of input ports of a first arrayed waveguide grating (AWG) and the first optical signal multiplexed via the first ring resonator is routed to the input port of the AWG based on the first wavelength channel,
wherein the first optical signal is further routed to a first output port of a plurality of output ports of the first AWG based on the first wavelength channel and is transmitted via an optical waveguide to a second bus waveguide in a second node; and
detuning the other ring resonators of the plurality of ring resonators to prevent multiplexing other optical signals in other input waveguides at the first node to the first bus waveguide,
wherein each of the other ring resonators tuned to a corresponding respective ring resonator's resonant wavelength is positioned to couple one of the other optical signals from one of the other input waveguides via the respective other ring resonator, and to couple the one of the other optical signals to the first bus waveguide via the respective other ring resonator.

2. The method of claim 1, further comprising:
monitoring the tuning by using the detector; and
monitoring the detuning by using detectors, each detector coupled to an end of the other input waveguides, to determine the optical power level of the other optical signals in the other input waveguides.

3. The method of claim 1, wherein tuning comprises changing an optical delay of the first ring resonator.

4. The method of claim 1, further comprising:
adjusting the mechanism to wavelength-tune the first ring resonator to wavelength-tune the first ring resonator to the first wavelength channel such that the optical power level of the optical signal at the first wavelength channel detected by the photodetector is minimized.

5. The method of claim 4, wherein minimizing the optical power level of the optical signal is based on the detected optical power level of the optical signal in the first input waveguide and corresponds to a maximum coupling of the optical signal at the first wavelength channel to the first bus waveguide.

* * * * *